Dec. 17, 1957 P. KAUFMAN 2,816,754

MAGNETIC COUPLING DEVICE

Filed March 3, 1954

INVENTOR.
PAUL KAUFMAN

BY Harry M. Saragovitz
ATTORNEY

# United States Patent Office 2,816,754
Patented Dec. 17, 1957

2,816,754

MAGNETIC COUPLING DEVICE

Paul Kaufman, Deal, N. J.

Application March 3, 1954, Serial No. 413,976

5 Claims. (Cl. 268—73)

(Granted under Title 35, U. S. Code (1952), sec. 266)

The invention described herein may be manufactured and used by or for the Government for governmental purposes, without the payment of any royalty thereon.

This invention relates to coupling devices and more particularly to a structure whereby a plurality of electric circuits may be coupled by a common magnetic field.

It is a primary object of the present invention to provide a magnetic structure including a plurality of sections wherein motion of one section relative to the rest of said structure does not affect the direction of the magnetic path, the reluctance of the magnetic circuit, and or the geometry of the structure.

It is a further object to provide a device for controlling a first electrical circuit, said first circuit including the primary of a transformer, by a second electric circuit, the second circuit including the secondary of said transformer, while relative motion exists between said primary and secondary and without the use of electrical contacts therebetween.

It is another object to provide a magnetic structure including a plurality of sections wherein a transmission of energy as well as control between circuits in relative motion is effected.

In accordance with the present invention, there is provided a device for controlling an electrical circuit including an alternating current potential source comprising a first magnetic structure having a first winding therearound connected in said electrical circuit, a rotatable second magnetic structure having a second winding therearound, the second magnetic structure forming a common magnetic circuit with the first structure, the magnetic circuit being unaffected by rotational movement of the second structure. Also included are means for short circuiting or varying the impedance of the secondary winding to effectively vary the impedance of the device.

For a better understanding of the invention, together with other and further objects thereof, reference is had to the following description taken in connection with the accompanying drawings and its scope will be pointed out in the appended claims.

Figure 1:
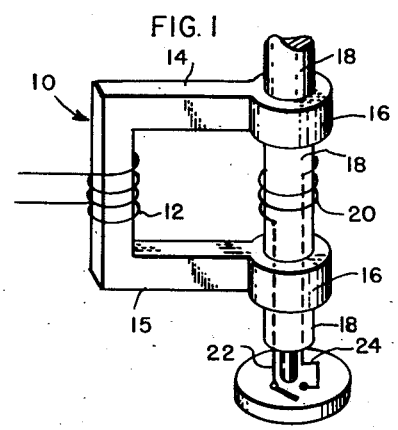
Fig. 1 is a perspective view of one embodiment of the invention.
Figure 2:
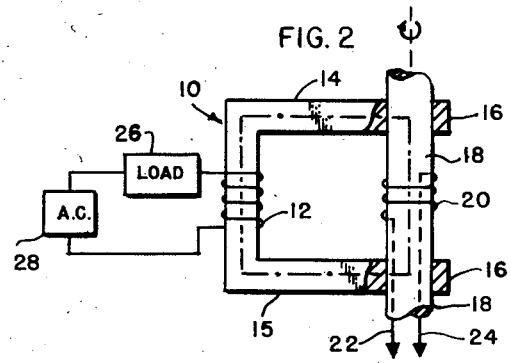
Fig. 2 is a view, partly in section, of the device of Fig. 1.

Referring now more particularly to Figs. 1 and 2, there is shown a preferred embodiment embracing the basic conception of the present invention. The primary section 10 of a reactor consisting of iron or other suitable ferromagnetic material has therearound a winding 12 which is included in an electrical circuit. Primary section 10 is substantially C shaped, the horizontal arms 14 and 15 of the C terminating in enlarged collar like rings 16 having cylindrical bores therethrough. Extending through and beyond each bore is the secondary section 18 of the transformer. By this arrangement, the magnetic flux is caused to pass in a closed circuit including section 10 and rotary section 18. Secondary section 18 may be a rotatable circular shaft having substantially the same diameter as internal diameters of the bores of rings 16 and is snugly received therewithin, there being only the necessity of sufficient clearance for section 18 to permit free rotation of section 18. Wound around secondary section 18 is the secondary winding 20 of the reactor, the leads 22 and 24 from each end of winding extending through the shaft via appertures therein. It is preferred to bring leads 22 and 24 through section 18 in order to maintain the air space between section 18 and the inner surface of the bores at a minimum. As can be seen in Fig. 2, whether section 18 is rotating or at rest, the path of the magnetic flux, indicated by the dashed line remains the same at all times. Another arrangement (not shown) could be to have section 18 form an abutting contact with the end portion of the lower surface of arm 14 or the upper surface of arm 15, a slight air gap being present at the abutment juncture. In such a situation, of course, the corresponding collar like ring 16 would be unnecessary, it being replaced by a solid extension integral with the abutting arm.

In operation, when alternating current potential source 28 is applied to primary winding 12, primary section 10, being an inductor with a ferromagnetic core presents a high impedance to the current flow in the circuit resulting in a low current for series connected load 26. Upon shorting leads 22 and 24 or varying the impedance (not shown) across these leads there is reflected back an effectively variable impedance to the primary circuit, thereby varying the effective impedance of the device. The net effect is to vary the amount of current for load 26. Since the rotation of section 18 does not affect the reluctance of the magnetic circuit, it is to be seen that by this arrangement, there is provided means for controlling the current through a circuit by a rotating structure coupled thereto.

The device of Figs. 1 and 2 may be varied by utilizing the saturation effect upon the magnetic structure of direct current flow in the secondary winding 20. This direct current may be obtained by rectification of the induced voltage in winding 20, by the insertion of a rectifier (not shown) in series therewith or by the connection of a direct current potential source (not shown) across leads 22 and 24. The variation of the amount of direct current permitted to flow in winding 20 will vary the reluctance of the magnetic structure and thereby vary the effective impedance of the device. As a result, the amount of alternating current through the load 26 will be varied. It can, thus, be seen that with such a device the circuit containing the load 26 can be controlled by the secondary structure coupled thereto by means of the common magnetic field, and the use of direct current enables control of the electrical circuit.

Figure 3:
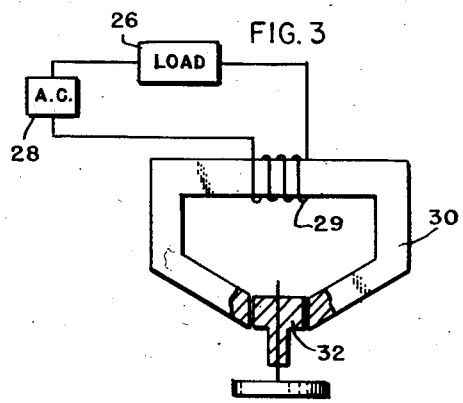
Figs. 3 and 4 are views, partly in section, of other embodiments of the present invention.

In the device of Fig. 3, the coil 29 which is wound about a magnetic structure 30 is in the load circuit. A plunger core 32 of like magnetic nature as structure 30 and which may be rotatable is positioned in the space between the open ends of structure 30 to complete the magnetic circuit. Upon moving the plunger out of the space a predetermined amount, part of the magnetic circuit becomes an air path thereby increasing the reluctance in the magnetic circuit. As a consequence of this increase, the impedance of coil 29 is decreased correspondingly increasing the current for load 26.

Figure 4:
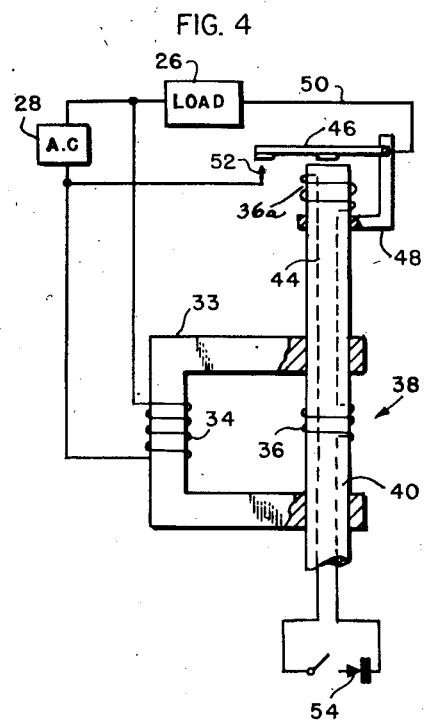

In the device of Fig. 4, primary coil 34 wound about C shaped magnetic section 33 induces a voltage in coil 36 which is wound about a first portion 40 of a rotary magnetic section 38. Section 38 bears a similar geometric relation to section 33 as does section 18 to section 10 in Figs. 1 and 2. A movable armature 46 is pivotedly mounted on an L shaped magnetic structure 48. Armature 46 upon being actuated when switch 54 is closed, is included in the load circuit by lead 50 and contact 52. Rectifier 54 is provided to convert the alternating current voltage induced in coil 36 to a direct current voltage whereby a direct current is provided in coil 36. Of course, a direct current potential (not shown) may be applied across leads 22 and 24 thus eliminating the need for rectifier 54.

In operation, upon applying an alternating current voltage to primary winding 34, a voltage is induced in coil 36 by transformer action. Rectifier 54 converts this alternating current voltage to a direct current voltage so that a direct current flows in coil 36 and coil 36a, and armature 46 is actuated to complete the load circuit through contact 52. This device thus exemplifies another instance wherein the load circuit is controlled by a rotating body coupled thereto. An example of an application of the device of Fig. 4 is the positional control of a rotating gun turret where the operator is mounted on the rotating platform and controls external stationary motors which determine the position of the platform. The use of magnetic field coupling eliminates the need for electrical or mechanical linkages in the control circuit between the rotating platform and the stationary motor drive.

Figure 5:
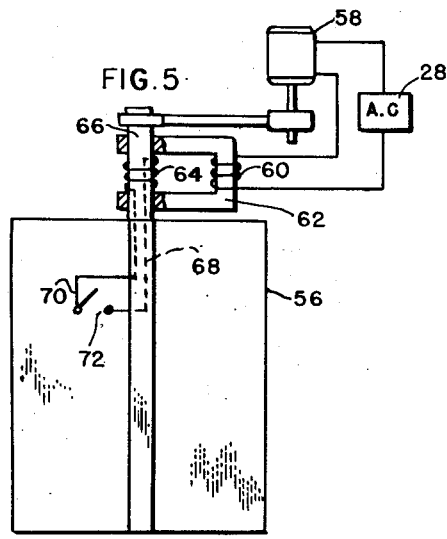
Fig. 5 is a view illustrating the device depicted in Figs. 1 and 2 in a circuit for controlling the motion of a revolving door.

In Fig. 5, there is shown an arrangement where the present invention may be utilized to actuate a revolving door 56 turned by a motor 58. The alternating current voltage in the winding 60 around magnetic section 62 in the motor circuit induces a voltage in secondary coil 64 wound about rotatable magnetic shaft 66. Upon varying the impedance (not shown) in series with coil 64, there results a variation in the impedance of the device and a consequent variation in the motor current. Leads 68 and 70 may be extended to switches such as at 72 located on the quadrature sections of revolving door 56. Another method would be to use an alternating current relay instead of motor 58 as the load in series with the device. In such an arrangement, variation in the current in coil 60 will effect an "on" or "off" condition of the relay. Of course, in this example, the relay would control a motor in an independent circuit to operate the door. In this manner, the disadvantages of the use of slip rings, brushes and the like to control the mechanical operation of the door are eliminated.

While there have been described what at present are believed to be preferred embodiments of the present invention, it will be understood by those skilled in the art that various changes and modifications may be made therein without departing from the invention and it is, therefore, aimed in the appended claims to cover all such modifications as fall within the spirit and scope of the invention.

What is claimed is:

1. Power controlling apparatus having a power source, a load, a circuit interconnecting said source and load, said apparatus including a power coupling means comprising a magnetic core system, a first coil on said core connected in said circuit, said core being composed of two sections one of which is rotatable with respect to the other to constitute a bearing, the interengaging bearing surfaces thereof acting to conduct the flux between the sections the reluctance of the bearing remaining constant during relative movement of said sections, a second coil on the other core section and means to vary the impedance in said second coil thereby to vary the impedance in said first coil.

2. Power controlling apparatus having a power source, a load, a circuit interconnecting said source and load, said apparatus including a power coupling means comprising a magnetic core system, said core being composed of two sections one of which is rotatable with respect to the other and wherein the connection between the two sections constitutes a plain cylindrical journal bearing presenting a fixed reluctance in the magnetic path of said core during relative motion between the core sections, a first coil on one of said core sections connected in said load circuit, a second coil on the other core section and means to vary the impedance in said second coil thereby to vary the impedance in said first coil.

3. A bearing controlling apparatus according to claim 2 together with an alternating current rectifying means connected to said second coil.

4. A controllable electric power driven system comprising a source of power, a motor driven thereby, a load connected to said motor having a driving shaft of magnetically permeable material, a bearing member of magnetically permeable material within which said shaft rotates said shaft and bearing constituting a two section low reluctance magnetic core, a first coil on one of said sections connected to control the flow of power to said motor, a second coil on the other core section and means to vary the impedance of said second coil thereby to vary the impedance of said first coil.

5. A controllable electric power driven system according to claim 4 and wherein the load is a revolving door.

References Cited in the file of this patent

UNITED STATES PATENTS

| | | |
|---|---|---|
| 1,373,922 | Thompson | Apr. 5, 1921 |
| 1,723,322 | Andorff | Aug. 6, 1929 |
| 2,129,331 | Littlefield | Sept. 6, 1938 |
| 2,341,545 | Hagenbook | Feb. 15, 1944 |
| 2,432,982 | Braddon | Dec. 23, 1947 |
| 2,434,601 | Taylor | Jan. 13, 1948 |
| 2,485,657 | Hex | Oct. 25, 1949 |